US011226809B2

(12) United States Patent
Mueller

(10) Patent No.: US 11,226,809 B2
(45) Date of Patent: *Jan. 18, 2022

(54) SYSTEMS AND METHODS FOR UPDATING VIRTUAL MACHINES

(71) Applicants: Atlassian Pty Ltd., Sydney (AU); Atlassian Inc., San Francisco, CA (US)

(72) Inventor: Fabian Mueller, Sunnyvale, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,289

(22) Filed: Sep. 14, 2020

(65) Prior Publication Data

US 2020/0409686 A1    Dec. 31, 2020

Related U.S. Application Data

(63) Continuation of application No. 16/226,438, filed on Dec. 19, 2018, now Pat. No. 10,802,813.

(51) Int. Cl.
*G06F 8/65* (2018.01)
*G06F 9/455* (2018.01)

(52) U.S. Cl.
CPC ............ *G06F 8/65* (2013.01); *G06F 9/45558* (2013.01); *G06F 2009/45562* (2013.01); *G06F 2009/45595* (2013.01)

(58) Field of Classification Search
CPC .................. G06F 8/65; G06F 9/45558; G06F 2009/45562; G06F 2009/45595

(Continued)

(56) References Cited

U.S. PATENT DOCUMENTS

2006/0184936 A1\* 8/2006 Abels ................... G06F 9/5077
718/1
2011/0022694 A1    1/2011 Dalal et al.
(Continued)

OTHER PUBLICATIONS

Hou et al, "Application-Assisted Live Migration of Virtual Machines with Java Applications," https://dl.acm.org/doi/pdf/10.1145/2741948.2741950, pp. 1-15, 2015.

(Continued)

*Primary Examiner* — S. Sough
*Assistant Examiner* — Zengpu Wei
(74) *Attorney, Agent, or Firm* — Brownstein Hyatt Farber Schreck, LLP

(57) ABSTRACT

A method and system for updating a virtual machine that is utilized as a base virtual machine for one or more linked clone virtual machines. The method comprises deploying the base virtual machine on a host system, the base virtual machine comprising a base virtual disk which is attachable to the one or more linked clones and a base delta disk. The method further comprises deploying a software update to the base delta disk of the base virtual machine and once the software update is deployed to the base delta disk of the base virtual machine, shutting down the base virtual machine. The method further comprises updating the base virtual machine by merging the software update deployed on the base delta disk of the base virtual machine with the base virtual disk of the base virtual machine.

18 Claims, 5 Drawing Sheets

(58) Field of Classification Search
USPC .......................................................... 717/171
See application file for complete search history.

(56) References Cited

U.S. PATENT DOCUMENTS

| | | | |
|---|---|---|---|
| 2012/0066677 A1 | 3/2012 | Tang et al. | |
| 2014/0074997 A1* | 3/2014 | Zhu | H04L 61/2076 709/222 |
| 2014/0201725 A1 | 7/2014 | Tian et al. | |
| 2015/0067168 A1 | 3/2015 | Hegdal et al. | |
| 2015/0127833 A1 | 5/2015 | Hegdal et al. | |
| 2015/0220324 A1 | 8/2015 | Arcese et al. | |
| 2015/0350101 A1* | 12/2015 | Sinha | G06F 9/45533 709/226 |
| 2016/0117163 A1 | 4/2016 | Fukui et al. | |
| 2016/0371105 A1* | 12/2016 | Sieffert | G06F 9/45558 |
| 2016/0378528 A1 | 12/2016 | Zamir et al. | |
| 2019/0056890 A1* | 2/2019 | Wookey | G06F 3/0604 |

OTHER PUBLICATIONS

Prevost et al, "Optimal Update Frequency Model for Physical Machine State Change and Virtual Machine Placement in the Cloud," https://ieeexplore.ieee.org/stamp/stamp.jsp?arnumber=6575260, pp. 159-164, 2013.

Schwarzkopf et al, "Multi-Layered Virtual Machines for Security Updates in Grid Environments," https://ieeexplore.ieee.org/stamp/stamp.jsp?tp=&arnumber=5350011, pp. 563-570, 2009.

Yamada et al., "Efficient Update Activation for Virtual Machines in IaaS Cloud Computing Environments," IEICE Trans. Inf. & Syst., vol. E97-D, No. 3, pp. 469-479, Mar. 2014.

\* cited by examiner

SYSTEMS AND METHODS FOR UPDATING VIRTUAL MACHINES

CROSS-REFERENCE TO RELATED APPLICATION(S)

This application is a continuation patent application of U.S. patent application Ser. No. 16/226,438, filed Dec. 19, 2018 and titled "Systems and Methods for Updating Virtual Machines," the disclosure of which is hereby incorporated herein by reference in its entirety.

TECHNICAL FIELD

Aspects of the present disclosure are directed to virtual machines, and in particular to updating virtual machines.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Generally speaking, a virtual machine is an emulation of a computer system that behaves like an actual computer. In other words, a virtual machine is a computer created within a computer and it can run, e.g., in a window, much like any other program, giving the end user the same experience as they would have on the host computer itself. Typically, the virtual machine is sandboxed from the rest of the system, such that the software inside a virtual machine is prevented from tampering with the computer itself. This produces an ideal environment for testing operating systems and applications including beta releases, accessing virus-infected data, etc. Each virtual machine, generally, provides its own virtual hardware, including CPUs, memory, hard drives, network interfaces and other devices. The virtual hardware is then mapped to the real hardware on a physical machine using virtualization software.

Typically when a particular type of virtual machine needs to be used multiple times, an 'image' of the virtual machine (VM) can be created and saved. The image is stored as a 'virtual hard disk' file and includes an operating system, data files, and/or applications utilized to create a VM. When a new VM needs to be created that has the same configuration as the saved VM image, the VM image can be used to create the virtual machine. This allows virtual machines to be created swiftly.

However, there is often a need to update the saved VM images. For instance, the operating systems, software applications, and/or data on the virtual machines may need to be updated or upgraded, a software bug (an error in the software) may need to be rectified, a security vulnerability (that can be exploited by a hacker or malicious software) may have to be addressed, or a performance enhancement needs to be made. In such scenarios, typically a new virtual machine image is created and any active virtual machine instances that were created using the previous virtual machine image are terminated and recreated from the new base image. This process typically involves a long downtime, which impacts users of the virtual machines and/or tasks being performed thereon. Termination of virtual machine instances means that users will be denied service during the downtime while the operating system is being upgraded. Due to limitations of existing solutions, administrators are often forced to make operating system upgrades or updates during nights or weekends to minimize customer impact.

SUMMARY

The appended claims may serve as a summary of the invention.

Figure 1:
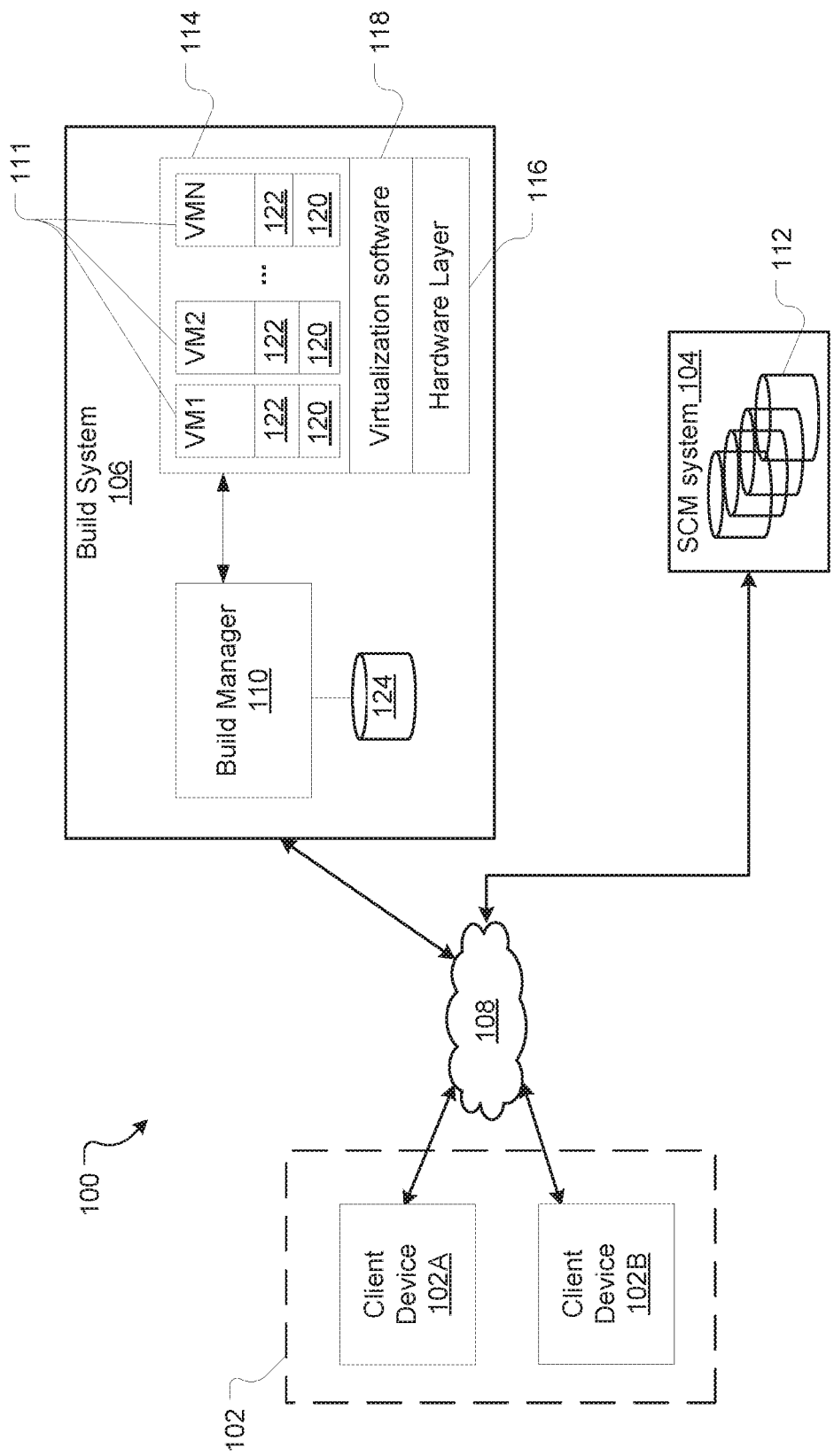
FIG. 1 is a block diagram illustrating a network environment in which certain aspects of the present disclosure may be implemented.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

Overview

In the following description, for the purposes of explanation, numerous specific details are set forth to provide a thorough understanding of the present invention. It will be apparent, however, that the present invention may be practiced without these specific details. In some instances, well-known structures and devices are shown in block diagram form to avoid unnecessary obscuring.

As used in this disclosure, the term 'virtual machine image' refers to an image of the virtual machine's disk including all its data. The image is stored as a file and no computing resources (host system, CPU, RAM, etc.) are assigned to a VM image. The term 'VM template' refers to a virtual machine which usually is assigned to computing resources, however, cannot be started up. This prevents the template from accidentally being modified and preserves the data on the disks of the template.

Typically, when a new virtual machine (VM) is required, it can be started in many different ways—e.g., by building from scratch, i.e., by specifying the operating system, the system memory, RAM, CPU settings, software applications, data, etc., for the VM. Alternatively, a VM may be created by cloning another VM.—in this case, the VM that is the basis of the cloning is called a parent or base VM. Two types of cloning may be possible—full cloning or linked cloning. A full clone is an independent copy of a virtual machine that shares nothing with the parent virtual machine after the cloning operation. Ongoing operations of a full clone are entirely separate from the parent virtual machine.

Building from scratch or using full clones may work well when a limited number of virtual machines are required at any given time. However, when the number of required virtual machines increases, the maintenance overheads associated with independent virtual machines becomes quite large. For instance, in case a VM is used as a build agent, in particular, it can be time intensive to track and fix issues in build environments that are caused by the builds and can affect subsequent builds.

A linked clone on the other hand is a copy of a virtual machine that shares virtual disks with the parent virtual machine in an ongoing manner. Accordingly, a linked clone is required to have continued access to the parent, without which the linked clone is disabled. This dependency or sharing of virtual disks conserves disk space, and allows multiple virtual machines to use a single software installation.

In certain cases, the base VM may be converted into a read-only VM image (called a template), which is derived from a snapshot of the base VM at a particular time. In brief, all files available on the base VM at the moment of the snapshot (e.g., the operating system, the environment, the signing certificates, provisioning profiles, etc.) continue to remain available to the linked clones. Each clone may have its own delta disk on which new or updated data can be written. In this way, multiple virtual machines can reuse the operating system and other files from their parent virtual machine's disk, but still perform its own operations upon creation independently of the base VM (and any other cloned VM).

As linked clones share the parent's operating system and environment including software applications (and in some cases data files), they can be created swiftly. In contrast, a full clone can take several minutes if the files involved are large. In addition, as any new data is written to a virtual disk of the linked clone (also referred to as a 'delta' disk) and not the parent's virtual disk, the build environments can be easily reset to a known good state—i.e., to the state of the parent VM by erasing the delta disk or restarting the linked clone. This also reduces maintenance overheads when the number of virtual machine clones increases.

Despite these advantages, there is an issue with using linked clones. The environment variables for virtual machines change frequently. For example, in the case of build agents, often new tools need to be installed, signing certificates need to be updated and/or new provisioning profiles need to be downloaded. It is generally not recommended to communicate the updates directly to each active linked clone as these updates are lost when the linked clone is recreated/rebooted as the linked clone's delta disk is erased upon termination and the disk reverts to the version of the parent VM machine upon recreation. Therefore, it is preferable to update the parent virtual machine first. However, with this approach, it is not possible to update software on the parent VM's hard disk while active clones are linked to the parent because the active clones are still reading from the parent/base VM's hard disk.

In these cases, the following process is typically followed—active clones are terminated, the parent virtual machine is updated or replaced, and clones are recreated from the updated or replaced parent VM. This often leads to long downtimes as clones cannot remain active or be created while the virtual disks of the parent virtual machine are being updated or replaced.

To address this issue associated with upgrading linked clones, aspects of the present invention use a base delta disk on the parent virtual machine (which is not shared with the linked clones). Updates are deployed to this base delta disk and during deployment (which can last up to an hour), the linked clones are still active and linked to the main disk of the parent virtual machine. Once the updates have been deployed to the parent VM, the active clones are terminated, the base delta disk on the parent VM is merged with the main disk of the parent VM such that all updates are included in the main disk, and the linked clones are restarted/reinitiated from the updated base VM.

It has been found that using this technique leads to much lower downtimes. Further, as the base VM is simply updated instead of being redeployed from scratch, the time taken to update the base VM is also shorter than the time taken to create a new parent VM from scratch.

The following sections describe examples system elements and process steps involved in updating virtual machines and especially linked clone virtual machines according to aspects of the present disclosure. Further, in the remainder of this disclosure, the systems and methods for upgrading virtual machines will be described with reference to build agents, as an example. However, it will be appreciated that the teachings herein are not in any way limited to, but more broadly can be used to upgrade any type of virtual machine linked clones.

Example Architecture

During the lifetime of a software application, the underlying source code for the software application is often updated. Each time the source code is updated, developers compile the source code into an executable file to test or to deploy in one or more environments.

The process of compiling the source code into an executable file is often referred to as a 'build'. When an organization deals with multiple software applications that need to frequently be built and deployed, the organization may employ one or more build agents to perform these operations. In computing terms, a build agent (which runs on a VM) is an entity that is programmed or configured to execute software builds—i.e., compile source code into an executable file, and send the executable file back to a build manager once complete. Depending on the number of builds scheduled for execution at any given time, build agents can be spun up—i.e., the more the number of builds, the more the build agents and vice versa.

In the present disclosure, one or more build agent base images or templates may be utilized to create linked clone virtual machines. For example, one build agent base template may be maintained for creating build agents that can build iOS applications and another base template may be maintained for creating build agents that can build Android applications.

FIG. 1 illustrates an example environment 100 in which aspects of the present disclosure are implemented. For instance, FIG. 1 depicts an environment which may be utilized by developers to update source code and build the updated source code into executable files. To do this, the environment 100 includes one or more client devices 102 that may be used by the developers to update source code, a source code management (SCM) system 104 for managing source code, and a build system 106 for building updated source code and returning executable files for further action. The client devices 102, SCM system 104, and the build system 106 communicate with each other over one or more communication networks 108.

The SCM system 104 stores source code repositories 112 (hereinafter referred to as repositories 112) and manages their content. It also receives/responds to requests from client devices 102 and the build system 106 to retrieve/store data in the repositories 112. For example, the SCM system 104 may notify the build system 106 when a user updates source code in a repository 112. In addition, the SCM system 104 may receive a request from the build system 106 to access source code from a repository 112 that has recently been updated. The SCM system 104, in response, may retrieve the requested source code and forward it to the build system 106.

The repositories 112 may include multiple versions of source code files and associated data. The associated data may include, e.g., a build descriptor, which includes, among other things, the steps for performing a build and identifiers of one or more testing environments (or VM images) to be utilized for the build. The build system 106 (as described in detail below) may be configured to retrieve the associated build descriptor.

The client devices 102 may be utilized by developers to communicate with the SCM system 104, and the build system 106. To that end, in certain embodiments, the client devices 102 include various installed applications such as an SCM client (not shown), a build client (not shown) and/or a web browser (not shown).

The SCM client may be configured to create local working copies of source code for software applications; modify the working copies; commit/push changes made in the working copies to the SCM system 104 (so that the changes are written to the relevant repository 112); fetch (e.g. pull) files from a repository 112 the developer has access to; provide a user interface for reading/writing source code and build instructions.

The build client may be configured to allow communication between the client device 102 and the build system 106. For example, it may allow a developer to register an SCM repository 112 for building with the build system 106. The web browser may be utilized to, for example, view build results provided by the build system 106.

In another embodiment, instead of dedicated SCM and build clients, the client device 102 simply includes a web browser and communicates with the SCM system 104 and the build system 106 via the web browser.

Only two client devices (102A and 102B) have been illustrated, but normal operation of the SCM system 104 typically involves many more client devices connected to the SCM system 104 to access data from/write data to repositories 112.

The client devices 102 may communicate with the other systems in environment 100 via suitable communication networks. For example, the client devices 102 may communicate with the SCM system 104 via private or public networks and/or with the build system 106 via public networks. It will be appreciated that based on the required implementation, any suitable communication network may be utilized to allow communication between the systems in environment 100.

As described in detail below, the build system 106 manage builds. Specifically, the build system 106 includes a build manager 110 and a pool of build agents 111. The build manager 110 may be configured to manage builds, for example, by detecting whether source code in a repository 112 is updated, retrieving a build descriptor from the repository 112, assigning/scheduling the updated source code to be built by a particular build agent in the pool of build agents 111, retrieving build results from the build agent, and providing the test results to the one or more client devices 102.

In addition to managing builds, the build manager 110 is configured to manage the build agents 111. For example, it may be configured to deploy build agents (e.g., by creating linked clones of a base build agent image/template), increase or decrease the number of build agents 111 based on demand, and/or update the build agents 111 when the underlying software of the build agents is updated. The methods for creating and updating build agents will be described in detail with respect to FIGS. 2-4.

In certain embodiments, the build agents 111 are deployed on one or more host systems 114. The host system 114 includes a hardware platform 116 and virtualization software 116 (also known as a "virtual machine monitor"), which allows the build agents 111 to interact with the underlying hardware platform 116 of the host system 114 and provides an environment in which one or more deployed build agents 111 can run. In some examples, the virtualization software may be VMware's hypervisor—ESXi.

In certain embodiments, the virtualization software 118 can interact directly with the hardware platform 116 of the host system 114 without an intervening host operating system. In such cases the virtualization software 118 can also include a kernel (not shown) that manages use of the hardware platform 116. Alternatively, the host system 114 can include its own operating system (not shown) and in such cases the virtualization software 118 can rely on the host operating system for physical resource management of the hardware platform 116.

Each build agent 111 running on the host system 114 can execute a guest operating system 120 and one or more software applications 122 (e.g., databases, build applications, etc.). The software code (e.g., binaries, configuration files, etc.) for the guest OS 120 and the one or more software applications 122 can be maintained in virtual disks that are stored in a database such as build database 124. In certain embodiments, the build database 124 may be configured as a storage area network (SAN) which includes network file system (NFS) datastores that store the virtual disks.

In the case of linked clones, each of the build agents 111 that is a linked clone of a particular base template is connected to the virtual disks of the base template that store software code for the guest operating system 120 and the software applications 122 such that the build agents 111 do not require their own individual virtual disks to store guest operating systems 120 or software applications 122. Instead, each linked clone may maintain its own delta disk for storing any data created during operation of the build agents 111. These delta disks may also be stored in the build database 124.

Figure 2:
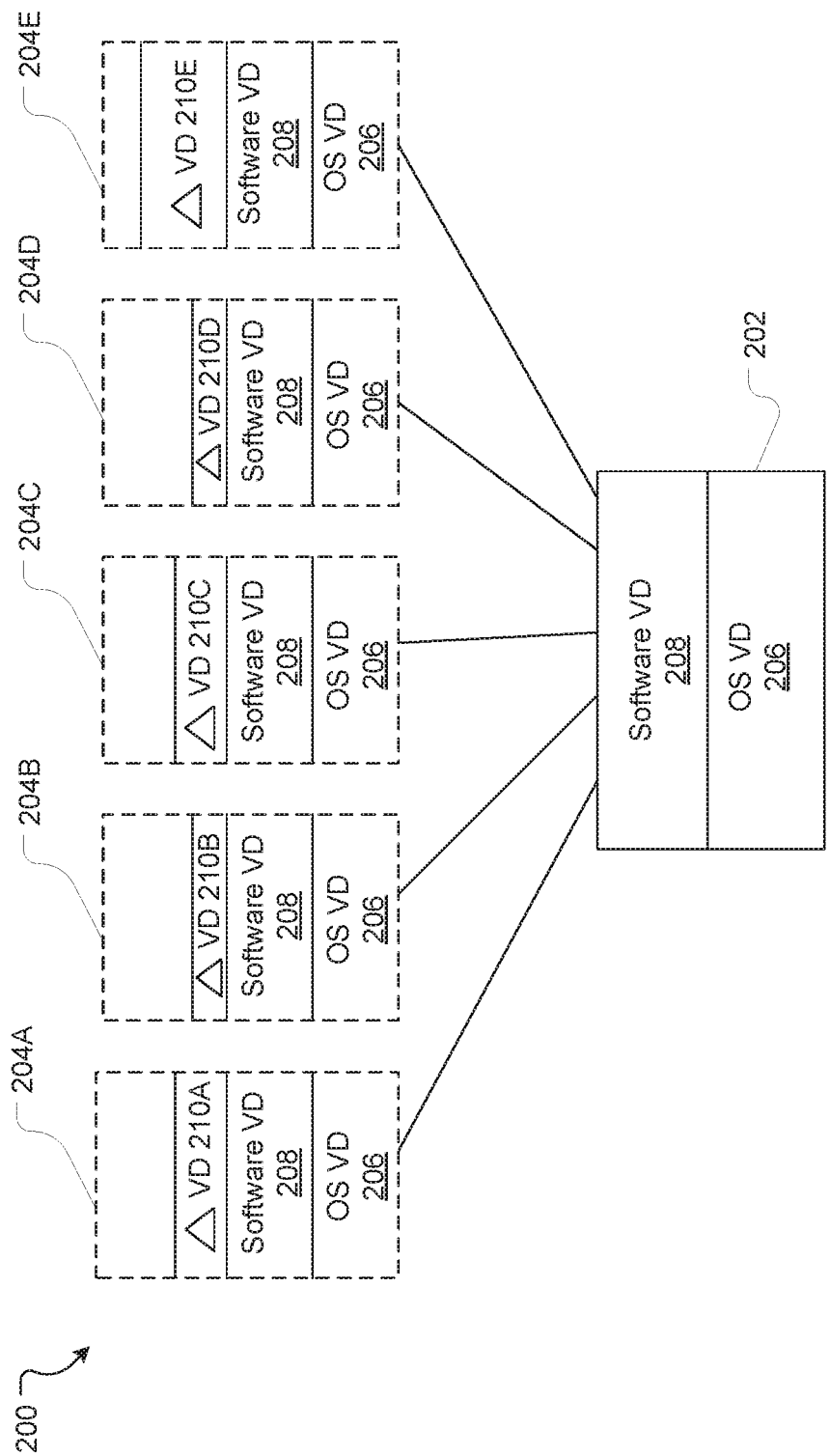
FIG. 2 is a schematic illustrating an example base VM and connected linked clones according to aspects of the present disclosure.

FIG. 2 is a block diagram illustrating a base template of a build agent 202 and five linked clone build agents 204-A-204-E (collectively referred to as linked clones 204). In certain embodiments, the base template 202 includes an operating system virtual disk 206 that stores an image of the installed OS 120 and a software application virtual disk 208 that stores an image of the installed software applications 122. In other embodiments, the base template may include a single virtual disk that stores an image of the installed OS and the installed software. As depicted, each of the five linked clones 204 includes its own delta virtual disk 210A-210E (collectively referred to as clone delta disk 210) and each linked clone 204 is attached to the operating system virtual disk 206 and software application virtual disk 208 of the base template 202. It will be appreciated that when the base template includes a single virtual disk, (for OS, software, and data) each linked clone 204 may be attached to that virtual disk.

Returning to FIG. 1, although only a single host system 114 is shown, it will be appreciated that the build manager 110 can communicate with multiple host systems 114, each hosting multiple build agents 111, without departing from the scope of the present disclosure. Further, the build agents 111 may be part of different linked clone groups where some build agents are linked clones of a particular base template whereas other build agents are linked clones of another base template.

In FIG. 1 the SCM system 104 and the build system 106 have been depicted as separate systems communicating over one or more networks 108. These systems (or their functionality) may, however, be divided over any number of physical systems communicating in any appropriate manner By way of example, these systems could be hosted by a single physical computer system as virtual machines.

Process for Creating Linked Clones

Figure 3:
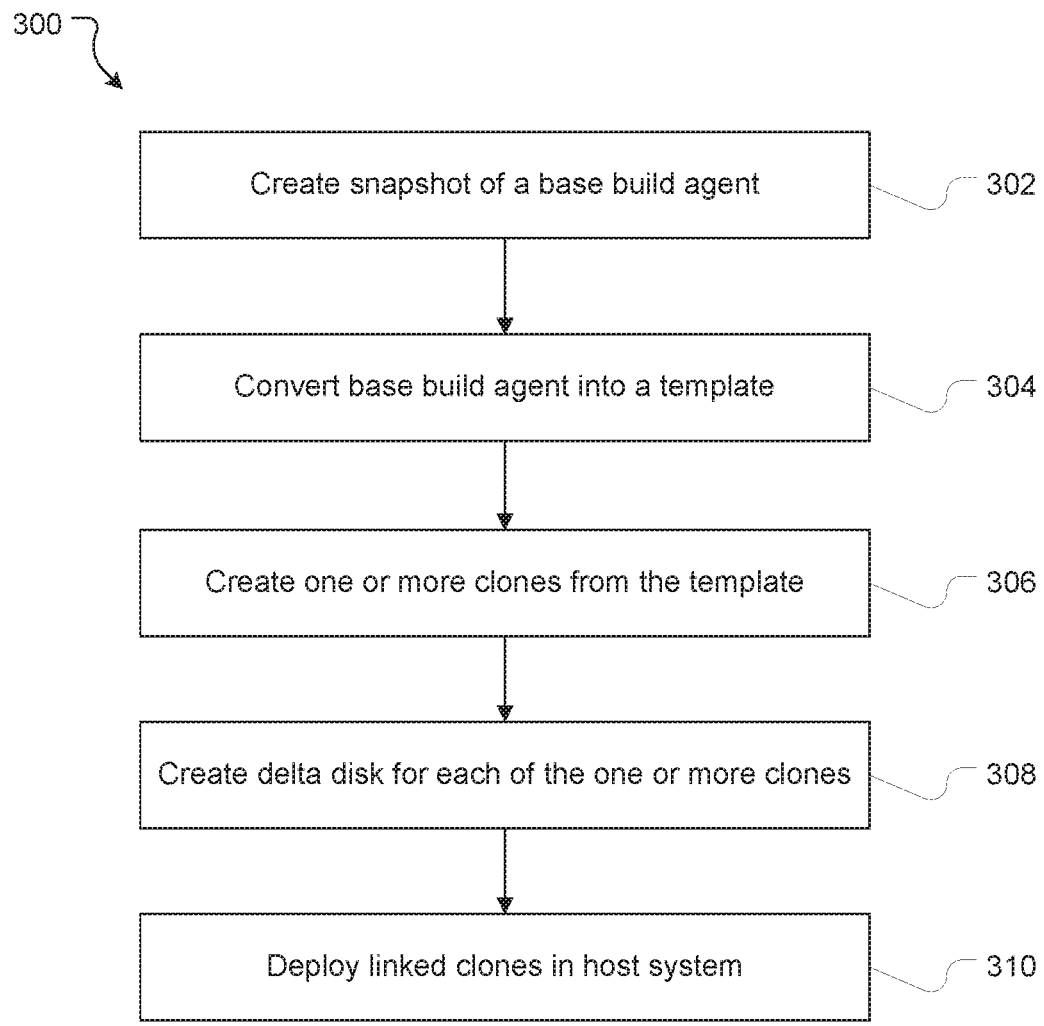
FIG. 3 is a flowchart illustrating an exemplary method for creating linked clone virtual machines according to aspects of the present disclosure.

FIG. 3 illustrates an exemplary process for creating and deploying one or more build agents by cloning a base template. In order to create the build agent in this manner, at step 302, the build manager 110 is configured to take a 'snapshot' of a build agent (either running or suspended) that is suitable for cloning. Generally speaking, a snapshot preserves the state and data of a virtual machine at a specific point in time. The state may include the virtual machine's power state (e.g., whether the virtual machine is powered-on, powered-off, or suspended). The data may include all the files that make up the virtual machine. This includes the state of the disks, memory, and other devices, such as virtual network interface cards at the time of the snapshot.

In certain embodiments, when a snapshot is taken, the build manager creates a number of files that capture the state of the virtual machine settings, the virtual disk, and in some cases the memory state of the virtual machine. These files reside with the virtual machine's base files. The files include one or more base delta disk files, base disk files and memory files. The base delta disk file is a file to which the guest operating system can write when the base virtual machine is deployed. This base delta disk represents the difference between the current state of the virtual disk and the state that existed at the time that the snapshot was taken. In some cases, the base delta disk may include two files—a descriptor file that includes information about the virtual disk, such as child-parent relationship information, and a corresponding data file that includes the raw data written by the guest OS.

The base disk files may include a flat file that comprises the raw data for the base virtual disk (including the OS, software applications, and/or any data recorded by the guest OS at the time the snapshot was taken). In addition, the base disk files may include a file that includes the virtual machine's snapshot information, which defines the relationships between snapshots of the base virtual machine and between base delta disks for each snapshot, for example. The memory file (if present), includes the active state of the virtual machine.

At step 304, the base VM is converted into a template 202 to avoid accidental modifications and conserve resources. As used herein, a template is different from a typical VM in that a template is not deployed on any hardware resources of any particular host system (and thus cannot be directly executed). Instead, a template defines an operating system and a common set of software installations and other associated configuration information that can be used as a template to provision actual VMs. The build agent template 202 may include one or more virtual disks (corresponding to the base disk described previously)—an operating system virtual disk 206 that includes an installation of a guest OS and a software virtual disk 208 that includes an installation of one or more software applications. In certain embodiments, the build agent template can also include configuration information for a third virtual disk (e.g., a data virtual disk including data such as digital signatures and provisioning profiles). Alternatively, as described previously, the build agent template may include a single virtual disk that includes the OS, software and data.

Thereafter, at step 306, the template 202 can be cloned to create one or more linked clones 204. Linked clone build agents can share substantially the same configuration as the base template 202, but are deployable (i.e., can be executed). Further, linked clones 204 can be attached, or linked, to the virtual disks of the template—i.e., the operating system virtual disk 206, the software virtual disk 208 and/or the data virtual disk. The linked clones are not attached to the base delta disk. These attachments allow each of the linked clones 204 to execute the same installation of the guest OS installed on the OS virtual disk 206 and the same installation of the software applications installed on the software binary virtual disk 208. The attachments also allow the linked clones 204 to access data, e.g., the digital signatures and provisioning profiles, stored in the data virtual disk of the template 204.

In addition to the attached virtual disks, a clone delta disk 210 is created for each linked clone 204 that is specific to the respective linked clone (at step 308). The build manager 110 may create these virtual disks 210—i.e., the delta disks of the linked clones—on the host computing systems 114 on which the linked clones 204 are provisioned. Alternatively, the clone delta disks 210 may be first created in the build database 124 and then transferred to the host system 114 when the linked clones 204 are created. In either case, once the clone delta disks are on the hardware platform 116 of the host system 114, the delta disks 210 can be attached to the linked clones 204. This attachment process can comprise defining a logical link (in the form of, e.g., configuration metadata) that enables linked clones 204 to access their respective delta virtual disks 210. In certain embodiments, the delta virtual disks 210 do not include any pre-installed software or data. Instead, the linked clones 204 can use their respective delta virtual disks 210 to store build results and other build agent-specific information that the linked clones 204 generate as part of their runtime operation.

In certain embodiments, the virtualization software 118 may utilize the NFS protocol over TCP/IP to access the designated virtual disks in the build repository 124 and mount a corresponding NFS volume on the host system 114 for the storage needs of the clones.

Finally, at step 310, the build manager 110 deploys the created linked clones on the host system 114 and initiates execution of the VMs.

Process for Updating Linked Clones

Figure 4:
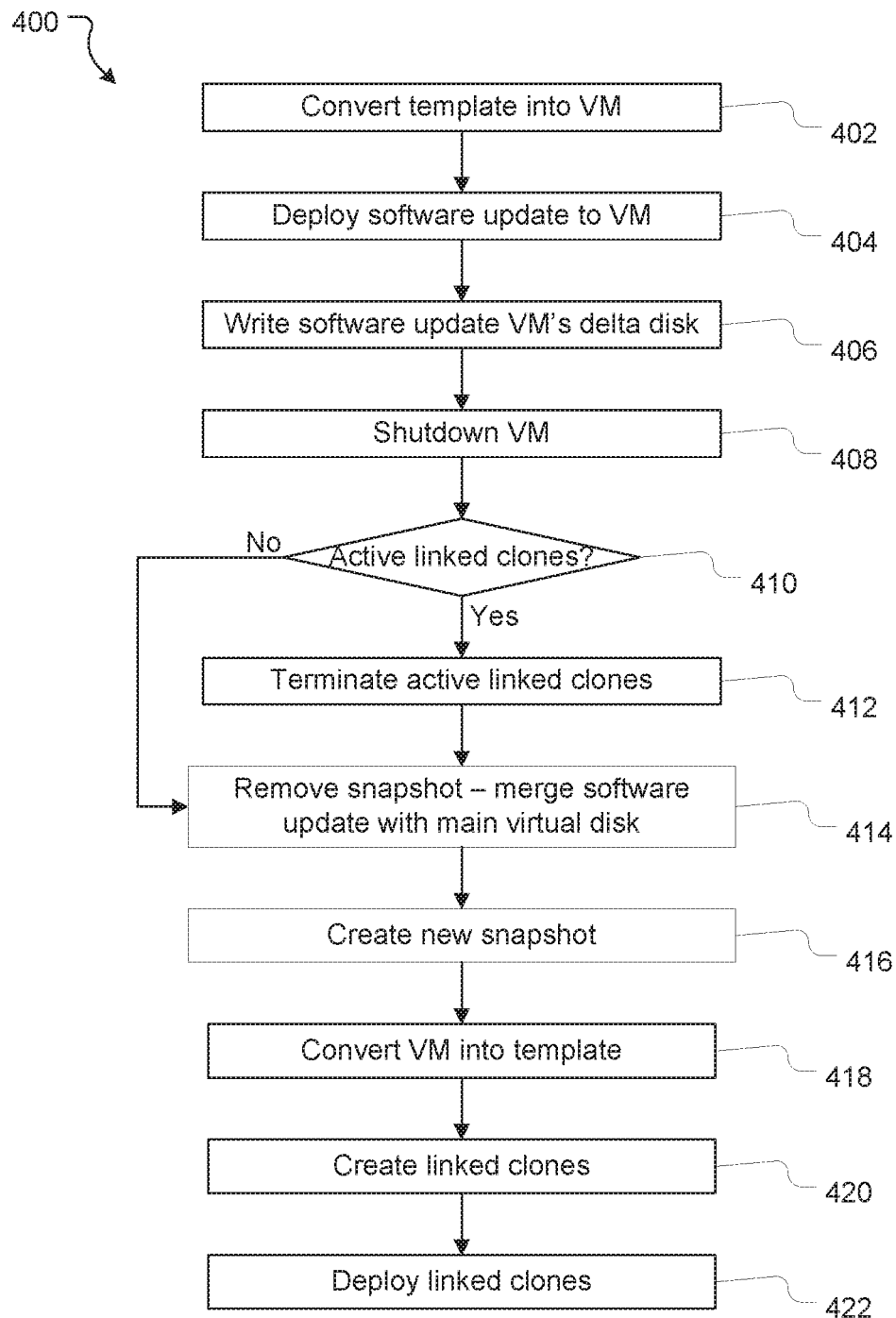
FIG. 4 is a flowchart illustrating an exemplary method for updating linked clone virtual machines according to aspects of the present disclosure.

FIG. 4 is a flowchart illustrating an exemplary method 400 for updating build agents. The method begins at step 402, where upon determining that a base template 202 needs to be updated (e.g., because the operating system, software application(s), and/or data stored in the virtual disks of the template VM needs to be updated), the build manager 110 converts the template 202 into a virtual machine and deploys it in the host system 114. In certain embodiments, a developer may utilize a client device 102 to push an update for a template 202 to the build system 106.

Next, at step 404, the build manager 110 deploys the software update to the created base VM. Once, the base VM is created in the host system 114, a DHCP server may automatically assign a dynamic IP address to the base VM which is utilized to communicate with external systems and the host system 114. At step 404, the build manager 110 obtains the dynamic IP address of the base VM. In certain embodiments, the build manager 110 may retrieve the IP address of the base VM from the guest OS 120 of the base VM. For example, certain software in the guest OS of the base VM (called 'VMware Tools') may report system information, including IP address, back to the virtualization software 118 which exposes the system information to the build manager 110 via an API. Using the retrieved IP address, the build manager 110 can deliver the software update to the base VM.

At step 406, the guest OS writes the software update to the delta disk of the base VM. As the update is written to the base delta disk and not any of the other parent virtual disks, the base VM can be updated without affecting any of the active linked clones also attached to the parent virtual disks.

Once the update is written to the delta data disk of the base VM, the base VM is shutdown/powered off (at step 408).

Next (at step 410), the build manager 110 determines if any linked clones 204 are attached to the virtual disks of the base template 202. If it is determined that one or more active linked clones 204 exist, the build manager 110 proceeds to step 412 where it terminates the active linked clones 204.

This termination may include a number of sub-steps. For instance, in some cases a virtual machine may be setup in such a manner that if the virtual machine were to be advertently or untimely terminated, an alert is sent to the associated developers informing them of this termination. In these cases, the build manager 110 may be configured to suppress the alerts for the affected linked clones 204 during the planned downtime. This prevents any alerts from being generated or communicated to the developers, thus preventing the developers from trying to reactive the virtual machines in the downtime.

The active linked clones 204 are then gracefully shutdown and the linked clones are destroyed. In certain embodiments, the build manager 110 waits for any builds in progress to complete before shutting down the linked clones. It need not necessarily wait for data to be written to the delta disks as the delta disks are deleted when the clone is terminated/destroyed. Once all the linked clones 204 are terminated and destroyed, which includes erasing their delta disks 210, the downtime begins.

Next (at step 414), the build manager 110 removes the previous snapshot of the base VM. When the snapshot is deleted, the delta disk associated with that snapshot (which includes the software update) is consolidated and written to the base virtual disk. In other words, the delta disk is merged with the virtual machine's base disk. Accordingly, the software update that was written to the delta disk in step 406 is merged back into the virtual machine's base disk—which now includes the updated OS, software and/or data files.

The build manager 110 subsequently creates a new snapshot of the base VM, at step 416. This step is similar to step 302 in that the snapshot preserves the state and data of the virtual machine at that specific point in time (i.e., after incorporating the software update).

The base VM is then converted into a template (read only) at step 418 to avoid accidental modifications and conserve resources. This step is similar to step 304 of FIG. 3.

Thereafter, at step 420, the template 202 can be cloned to create one or more linked clones 204. In certain embodiments, the build manager 110 stores the identifiers of the build agents that were terminated at step 412 and is configured to recreate those build agents. Alternatively, the build manager 110 may determine the current demand and queue of scheduled build tasks to determine the number of linked clones to recreate.

As before, the linked clones 204 can be attached, or linked, to the virtual disks of the template—i.e., the operating system virtual disk 206, the software virtual disk 208 and the data virtual disk of the template VM. These attachments allow each of the linked clones to execute the same installation of the OS and software applications installed on the template's virtual disk. The attachments also allow the linked clones 204 to access data e.g., the digital signatures and provisioning profiles, stored in the data virtual disk of the template 202.

In addition to the attached virtual disks, the build manager 110 once again creates a delta data virtual disk 210 for each linked clone that is specific to the respective linked clone and attaches the delta disks to the linked clones 204.

Finally, at step 422, the build manager 110 deploys the created linked clones 204 on a host system 114 and initiates execution of the build agents. This step may include further sub-steps, such as converting the random dynamic IP addresses assigned to the linked clones into static IP addresses which can be mapped onto static hostnames.

For some operations (e.g., to start up a build agent process), the build manager 110 requires direct access/connection to the linked clone 204 and for this the build manager needs to know how to address/contact the linked clone. The problem is that when a linked clone is started up, a DHCP server automatically assigns a random IP address to the linked clone and the build manager 110 is unaware of this IP address.

As described previously, a tool installed on the guest OS of the linked clone makes this IP address along with other system information available to the virtualization software 118, which in turn can be queried by the build manager 110 to obtain the IP address.

Once the build manager 110 retrieves the IP address, in certain embodiments, it is configured to update that random IP address into a static IP address that the build manager 110 has mapped to a domain name server hostname (e.g., build-agent-1.atlassian.com). To that end, the build manager 110 utilizes the virtualization software 118 and the VMware Tools (as mentioned previously) to run a command inside the guest OS which updates the IP address to the static IP address. Thereafter, the build manager 110 can communicate with the linked clone via its assigned host name.

In addition to this, step 422 may further include enabling any alerts that were disabled at step 412.

Accordingly, it will be appreciated that with this process, the linked clones are in downtime only after the software update is written to the parent VM's delta disk. This results in lower down time as compared to other known techniques where the linked clones are first terminated and the base virtual machine is subsequently updated or entirely replaced with another base machine. Further, as updates can directly be applied to the base VM without the need to rebuild the entire image, only the updates need to be uploaded to the build system 106. This conserves network bandwidth and reduces deployment time significantly, when compared to techniques where complete newly built images need to be uploaded to the build system 106. As VM files can be very large, these previously known techniques can take quite some time to upload the entire VM image (depending on the available bandwidth).

For instance, it has been observed that for smaller updates e.g., when updating a software tool to its latest version, installing a new tool and/or installing code signing certificates, previously known techniques required around 45 minutes, whereas when the currently disclosed techniques were employed, the base VM could be updated in about 5-6 minutes. Similarly, for larger updates, e.g., installing OS updates and/or new versions of integrated development environments, such as Xcode (which is used for iOS application builds), previously known updating techniques required longer times (e.g., around 90 minutes), partially because large installation files needed to be downloaded. But, with the presently disclosed systems and methods, the time taken to merge the delta disk back into the base VM's main disk even for larger updates can be as short as 10-15 minutes.

In the above described systems and methods, the build manager 110 is shown to manage the virtual machines and/or perform virtual machine functions. However, it will be appreciated that this need not always be the case. In other embodiments/implementations a build agent may be configured to manage the virtual machines and/or perform the VM operations.

Computer System

Embodiments and features described herein are implemented by one or more special-purpose computing devices. The special-purpose computing devices may be hard-wired to perform the techniques described, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, server systems, or any other device/system that incorporates hard-wired and/or program logic to implement the techniques.

Figure 5:
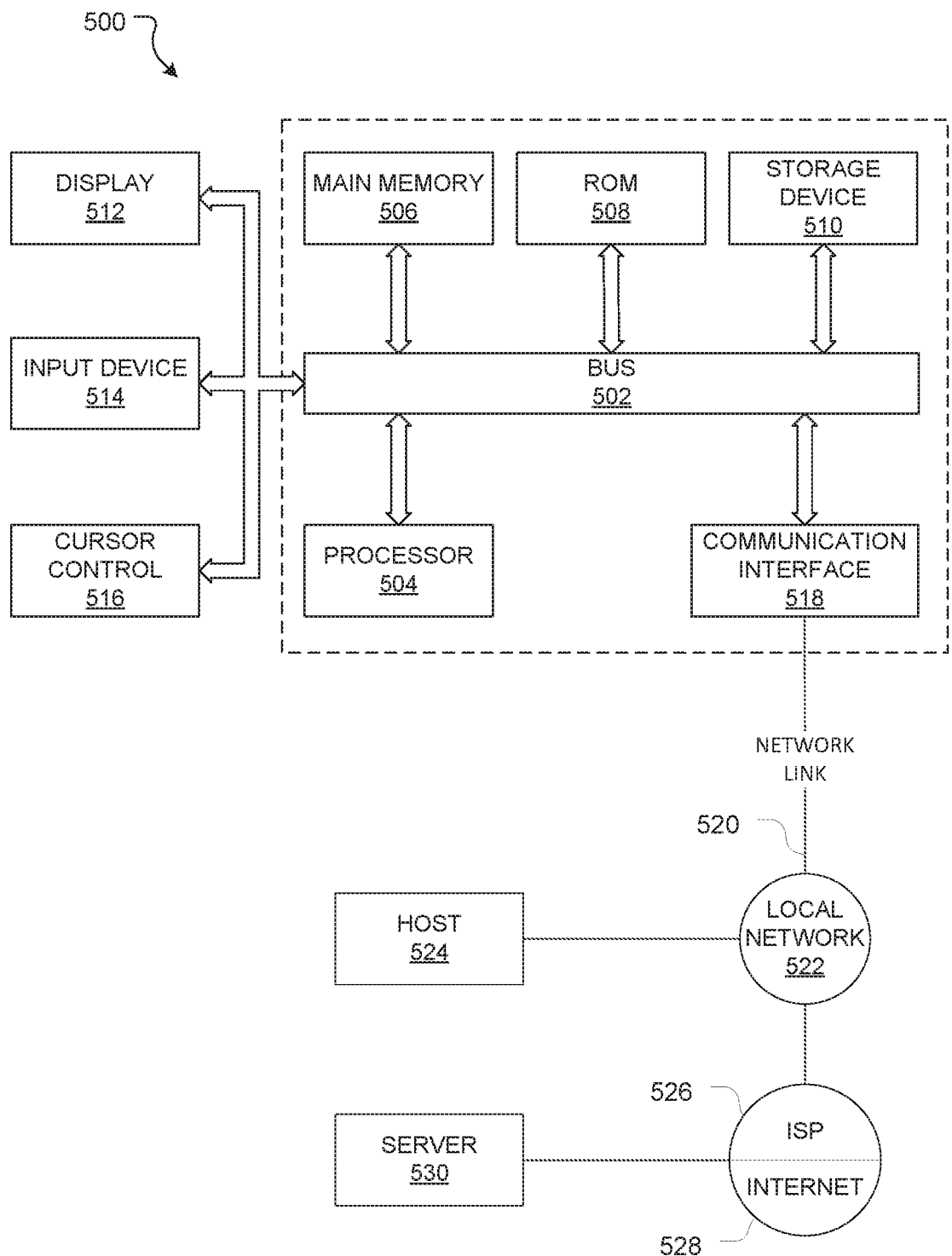
FIG. 5 is a block diagram illustrating a computer system, which may be used to implement various embodiments.

For example, FIG. 5 is a block diagram that illustrates a computer system 500 upon which embodiments of the invention may be implemented. For example, the build system 106 and/or the SCM system 104 may be implemented by one or more computer systems, and each of the client devices 102 may be implemented as separate computer systems such as computer system 500.

Computer system 500 includes a bus 502 or other communication mechanism for communicating information, and a hardware processor 504 coupled with bus 502 for processing information. Hardware processor 504 may be, for example, a general purpose microprocessor (e.g. a CPU) or a special purpose processor (e.g. a graphical processing unit or GPU).

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by the processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, solid state disk, or optical disk, is provided and coupled to bus 502 for storing information and instructions.

In case the computer system 500 is implemented as a user interface device, it may be coupled, via bus 502, to one more output devices such as a display 512 for displaying information to a computer user. Display 512 may, for example, be a cathode ray tube (CRT), a liquid crystal display (LCD), a light emitting diode (LED display), or a touch screen display. An input device 514, including alphanumeric and other keys, may be coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Additional and/or alternative input devices are possible, for example touch screen displays.

Computer system 500 may implement the techniques described herein using customized hard-wired logic, one or more ASICs or FPGAs, firmware and/or program logic which in combination with the computer system causes or programs computer system 100 to be a special-purpose machine. In certain embodiments, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of communications or telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

A computer system as described herein may be configured in a plurality of useful arrangements. In one approach, a data processing method comprises using a computer system, obtaining from one or more non-transitory computer-readable data storage media a copy of one or more sequences of instructions that are stored on the media and which when executed by the computer system processor cause the computer system to perform (either alone or in combination with one or more additional computer systems), the techniques that are described herein.

A computer system may take a variety of forms. For example, a client device such as system 102 may be in the form of a desktop computer, a laptop computer, a notebook computer or the like. A server side system such as the build system 106 and/or the SCM system 104 may be in the form of a processing system.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using process steps. The functionality/processing of a given process step could potentially be performed in various different ways and by various different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extends to alternative combinations of two or more of the individual features mentioned or evident from the text or drawings. These different combinations constitute various alternative aspects of the embodiments.

The invention claimed is:

1. A computer-implemented method for updating a virtual machine that is utilized as a base virtual machine for a set of linked clone virtual machines, the method comprising:
    deploying the base virtual machine on a host system, the base virtual machine comprising:
        a base virtual disk which includes an attachment to the set of linked clone virtual machines, the attachment allowing each of the set of linked clone virtual machines to:
        execute a same installation of an operating system installed on the base virtual disk, execute a same installation of one or more software applications installed on the base virtual machine, and access data stored on the base virtual disk, and
        a base delta disk that does not include an attachment to the set of linked clone virtual machines;
    while the set of linked clone virtual machines is operational, deploying a software update to the base delta disk of the base virtual machine;
    subsequent to the software update being deployed to the base delta disk of the base virtual machine, determining that an active linked clone of the set of linked clone virtual machines exists and in response, terminating the active linked clone before updating the base virtual machine;
    causing the software update to be transmitted to the base virtual machine using a dynamic IP address that is assigned to the base virtual machine;
    subsequent to the software update being transmitted to the base virtual machine and prior to updating the base virtual machine, shut down the base virtual machine;
    updating the base virtual machine by merging the software update deployed on the base delta disk of the base virtual machine with the base virtual disk of the base virtual machine thereby generating an updated base virtual machine that includes an updated base virtual disk; and
    in response to updating the base virtual machine, reinitiating a linked clone virtual machine of the set of linked clone virtual machines, the linked clone virtual machine being updated based on the updated base virtual machine.

2. The method of claim 1, wherein updating the active linked clone comprises:
    obtaining a dynamic IP address of the linked clone virtual machine from the host system;
    using the dynamic IP address to communicate with the linked clone virtual machine to assign a static IP address to the active linked clone;
    mapping the static IP address to a domain name server hostname; and
    using the domain name sever hostname to communicate with the linked clone virtual machine.

3. The method of claim 1, wherein:
prior to deploying the base virtual machine on the host system, the method further comprises:
saving a snapshot of the base virtual machine; and
creating a read-only template of the base virtual machine.

4. The method of claim 3, wherein each linked clone virtual machine of the set of linked clone virtual machines comprises a respective clone delta disk.

5. The method of claim 3, further comprising:
saving a snapshot of the updated base virtual machine after merging the software update deployed on the base delta disk with the base virtual disk of the base virtual machine, and
creating a read-only template from the updated base virtual machine.

6. The method of claim 1, wherein:
the base virtual machine comprises a software application virtual disk; and
a software application of the one or more software applications is stored on the software application virtual disk.

7. A system for updating a virtual machine that is utilized as a base virtual machine for a set of linked clone virtual machines, the system comprising:
a processor,
a communication interface, and
a non-transitory computer-readable storage medium storing sequences of instructions, which when executed by the processor, cause the processor to:
deploy the base virtual machine on a host system, the base virtual machine comprising:
a base virtual disk which includes an attachment to the set of linked clone virtual machines, the attachment allowing each of the set of linked clone virtual machines to: execute a same installation of an operating system installed on the base virtual disk, execute a same installation of one or more software applications installed on the base virtual machine, and access data stored on the base virtual disk, and
a base delta disk that does not include an attachment to the set of linked clone virtual machines;
deploy a software update to the base delta disk of the base virtual machine;
subsequent to the software update being deployed to the base delta disk of the base virtual machine, determining that an active linked clone exists and, in response, terminating the active linked clone before updating the base virtual machine;
cause the software update to be transmitted to the base virtual machine using a dynamic IP address that is assigned to the base virtual machine;
subsequent to the software update being transmitted to the base virtual machine and prior to updating the base virtual machine, cause the base virtual machine to shut down;
update the base virtual machine by merging the software update deployed on the base delta disk of the base virtual machine with the base virtual disk of the base virtual machine thereby generating an updated base virtual machine that includes an updated base virtual disk; and
in response to updating the base virtual machine, reinitiating a linked clone virtual machine of the set of linked clone virtual machines on the host system based on the updated base virtual machine.

8. The system of claim 7, wherein to deploy the active linked clone, the system further comprises instructions which, when executed by the processor, cause the processor to:
obtain a dynamic IP address of the linked clone virtual machine from the host system;
use the dynamic IP address to communicate with the linked clone virtual machine to assign a static IP address to the active linked clone;
map the static IP address to a domain name server hostname; and
use the domain name sever hostname to communicate with the linked clone virtual machine.

9. The system of claim 7, further comprising instructions which, when executed by the processor, cause the processor to:
prior to deploying the base virtual machine on the host system:
save a snapshot of the base virtual machine, the snapshot preserving the base virtual disk of the base virtual machine at a specific point in time; and
create a read-only template of the base virtual machine.

10. The system of claim 9, to update the base virtual machine, further comprising instructions which, when executed by the processor, cause the processor to:
delete the snapshot of the base virtual machine.

11. The system of claim 9, further comprising instructions which, when executed by the processor, cause the processor to:
save a snapshot of the updated base virtual machine after merging the software update deployed on the base delta disk with the base virtual disk of the base virtual machine, and
create a read-only template from the updated base virtual machine.

12. The system of claim 7, wherein:
the base virtual machine comprises a software application virtual disk; and
a software application of the one or more software applications is stored on the software application virtual disk.

13. A non-transitory computer readable storage medium comprising instructions which, when executed by a processor, cause the processor to:
update a virtual machine that is utilized as a base virtual machine for a set of linked clone virtual machines, by:
deploying the base virtual machine on a host system, the base virtual machine comprising a base virtual disk which includes an attachment to the set of linked clone virtual machines, the attachment allowing each of the set of linked clone virtual machines to: execute a same installation of an operating system installed on the base virtual disk, execute a same installation of one or more software applications installed on the base virtual machine, and access data stored on the base virtual disk, and a base delta disk that does not include an attachment to the set of linked clone virtual machines;
while the set of linked clone virtual machines is operational, deploying a software update to the base delta disk of the base virtual machine;
subsequent to the software update being deployed to the base delta disk of the base virtual machine, determining that an active linked clone of the set of linked clone virtual machines exists and, in response, terminating the active linked clone before updating the base virtual machine;

causing the software update to be transmitted to the base virtual machine using a dynamic IP address that is assigned to the base virtual machine;

subsequent to the software update being transmitted to the base virtual machine and prior to updating the base virtual machine, shut down the base virtual machine;

updating the base virtual machine by merging the software update deployed on the base delta disk of the base virtual machine with the base virtual disk of the base virtual machine thereby generating an updated base virtual machine that includes an updated base virtual disk; and in response to updating the base virtual machine, recreating and redeploying a linked clone virtual machine of the set of linked clone virtual machines on the host system based on the updated base virtual machine.

14. The non-transitory computer readable storage medium of claim 13, wherein each linked clone of the set of linked clone virtual machines comprises a respective clone delta disk.

15. The non-transitory computer readable storage medium of claim 13, further comprising instructions for:

obtaining a dynamic IP address of the linked clone virtual machine from the host system;

using the dynamic IP address to communicate with the linked clone virtual machine to assign a static IP address to the linked clone virtual machine;

mapping the static IP address to a domain name server hostname; and using the domain name sever hostname to communicate with the linked clone virtual machine.

16. The non-transitory computer readable storage medium of claim 13, further comprising instructions for, prior to deploying the base virtual machine on the host system:

saving a snapshot of the base virtual machine, the snapshot preserving the base virtual disk of the base virtual machine at a specific point in time; and creating a read-only template of the base virtual machine.

17. The non-transitory computer readable storage medium of claim 16, wherein updating the base virtual machine comprises deleting the snapshot of the base virtual machine.

18. The non-transitory computer readable storage medium of claim 16, further comprising instructions for:

saving a snapshot of the updated base virtual machine after merging the software update deployed on the base delta disk with the base virtual disk of the base virtual machine, and creating a read-only template from the updated base virtual machine.

* * * * *